July 7, 1959 P. L. ALGER 2,894,190
REACTOR CONTROLLED DUAL WINDING INDUCTION MOTOR
Filed April 29, 1957 3 Sheets-Sheet 1
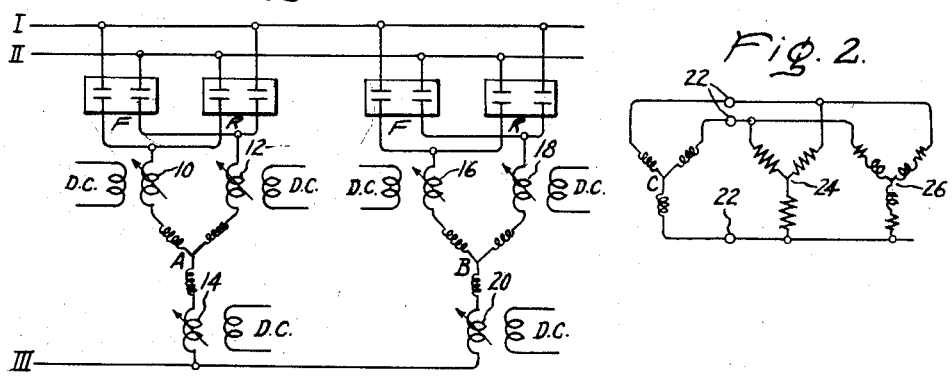
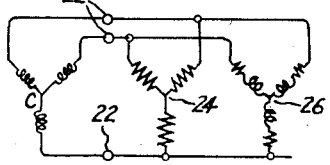
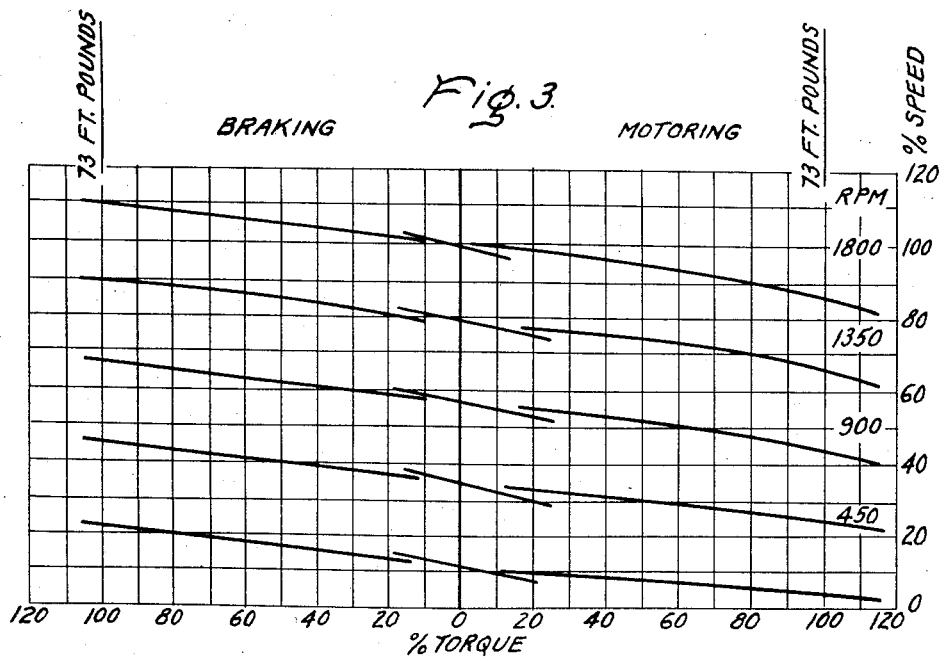
Inventor:
Philip L. Alger,
by Vernon J. Kalb
His Attorney.

Inventor:
Philip L. Alger,
by Vernon F. Kalb
His Attorney.

United States Patent Office 2,894,190
Patented July 7, 1959

2,894,190

REACTOR CONTROLLED DUAL WINDING INDUCTION MOTOR

Philip L. Alger, Schenectady, N.Y., assignor to General Electric Company, a corporation of New York Application April 29, 1957, Serial No. 655,706

7 Claims. (Cl. 318—228)

The invention described herein relates to dynamoelectric machines and more particularly to a voltage controlled dual winding polyphase induction motor, and has for its object, the provision of a motor capable of providing constant speed performance at any preset speed over a complete range of 100% in either direction of rotation, while simultaneously satisfying the instantaneous torque requirements of a connected load throughout the full range of torque from plus to minus, depending on whether the motor is performing a motoring or braking function.

Direct current motors and alternating current motors coupled or otherwise connected to an eddy current clutch, have conventionally been used for providing precise and stepless speed control of machines requiring variable speeds for their operation. During recent years however, attempt has been made to supplant these types of motor drives with induction motors and many different control circuits and winding arrangements have been conceived in an attempt to adapt the A.-C. motor to a particular load and to obtain the desired performance characteristics. Such circuits and winding arrangements include external control of voltage impressed on the motor windings by means of different types of magnetic amplifiers whose core magnetization is varied in accordance with well known principles to obtain voltage of the desired magnitude across the windings.

The invention described herein utilizes a dual primary winding. In the past, double windings have been assembled on the stator in a manner wherein adjacent phases of each winding are permanently connected for parallel operation or in series for high voltage operation thus providing, in effect, a single winding on the machine. A different arrangement, sometimes used in hoistening apparatus, consists in employing one winding with a certain number of poles for high speed operation while the other, having a greater number of poles, is made effective for low speeds, with the necessary torque for regenerative braking being provided by the low speed winding.

The principal disadvantages of these known designs are that they are not inherently capable of duplicating the desirable speed torque range of the conventional direct current motor drive because the induction motor must be reversed to obtain braking torque. It is known that schemes have been developed to provide reverse motor torque in A.-C. motors by a suitable combination of transformers and saturable reactors in the primary circuit with control means which shift the magnitudes and phase angles of the voltages applied to the motor terminals through the full range from forward to reverse rotation.

However, all these schemes for shifting the phase angle of the voltage applied between two motor terminals depend on connecting a single motor terminal to two different power supply phases through independent saturable reactors. When the direct current controlling one of these reactors is zero, its impedance is very high, and the current drawn from the line is correspondingly small. By holding either one of the line currents small in this way, while the control current of the other reactor is varied, a considerable range of motor torque and speed can be obtained in either forward or reverse direction as required. However, when the transition is made from forward to braking torque, with such a scheme, and without allowing the motor to let go of the load at any time, one of the control currents must be raised, while the other one is being lowered; and at the midpoint of the transition both of the saturable reactors have much less than their maximum impedance. Under this condition, a current flows from one power line to the other through the two reactors in series, by-passing the motor. This "through current" from line to line is objectionable because of the additional kva. taken from the line, and also because it requires an increase in the size and heating of the reactors themselves.

The above-noted disadvantage is overcome with the new dual winding scheme described herein. For, with the identical dual windings, there is no direct electrical connection between the two power lines and any through current that flows from line to line must flow through the two half phase windings of the motor in series acting as a transformer, as well as through the separate reactors.

This greatly increases the "through reactance" and thereby reduces the parasitic current. Also, with the dual winding arrangement, the control current of one of the windings can be brought to zero, thereby reducing the corresponding current in the half phase to a very small value, and the connection of this half phase can be transferred to another power line by contactor operation without letting go of the load, which is caused meanwhile by the other winding. Therefore, for these two reasons, the reactor current drawn from the line is less, and the effective size and heating of the reactors are materially reduced, as compared with previous schemes using a single motor winding.

It therefore is a further object of my invention to eliminate the above-noted deficiencies by providing an improved induction motor capable of supplying precise and stepless speed control throughout a complete range of speeds in both directions of rotor rotation, and throughout a complete range of torque requirements up to a maximum, while still maintaining full control of the load during all conditions of operation.

In carrying out these objects of my invention, I provide a motor having a polyphase winding consisting of a substantially identical pair of half windings wound in the stator, with external saturable reactors in series with each of the phases of each half winding for independently controlling the currents in the two circuits. Asymmetric alternate pole winding connections are used, providing one half winding or circuit with only north poles and the other only south poles, so as to limit magnetic noise and unbalanced forces in the machine. Alternate pole symmetric connections may be used when it is desirable to have maximum "through reactance," thereby reducing the flow of parasitic currents to a minimum. In order to obtain the desired torque output at any preselected constant speed, during either a motoring or braking operation, contactors may be interposed between the reactors and the power lines for providing current of the desired magnitude and direction to either or both of the windings on the machine. Alternatively, control of the winding currents and therefore of the machine can be accomplished by the use of saturable reactors alone without the aid of contactors in the control scheme.

The subject matter which I regard as my invention is particularly pointed out and distinctly claimed in the concluding portion of this specification. My invention, however, both as to organization and method of operation, together with further objects and advantages thereof, may best be understood by reference to the following description taken in connection with the accompanying drawings in which:

Figure 1 is a diagrammatic view of a dual winding connection for reactor speed control of a polyphase induction motor;

Figure 2 shows a secondary winding for the motor of Figure 1 connected to an external resistance-reactance network;

Figure 3 illustrates speed torque curves of a dual winding motor with saturable reactor speed control;

Figure 7:
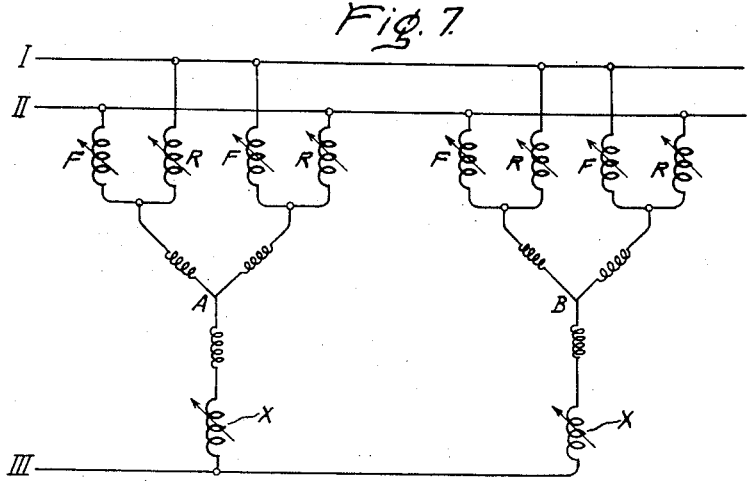
Figure 7 is another modification utilizing saturable reactors alone for obtaining full motoring and braking torque in the motor.

Referring now to the drawings wherein like reference characters designate like or corresponding parts throughout the several views, there is illustrated in Figure 1, a dual winding connection for reactor speed control of a polyphase induction motor consisting of a pair of primary half windings A and B, having identical and independent magnetic amplifiers, such as single phase saturable reactors, 10, 12, 14 and 16, 18 and 20 interposed between the windings and power lines I, II and III in the manner shown. Two pairs of contactors F and R employed for achieving forward and reverse rotation of the motor independently connect each half winding A and B to the power lines according to the demands of a control circuit arranged for cooperation therewith. In the illustrated embodiment of the invention, the windings are shown connected in Y although it will be understood that the teachings apply equally to those arranged for delta connection. Also, depending on the particular application, as when a different amount of power is required in the reverse direction, it may be preferable to reverse only one of the half windings as shown in Figure 7. As described herein, the half windings are assumed to be substantially identical since it is preferable to have fractional slots per pole and therefore a slightly different sequence of slots per phase belt for each half winding. In order to reduce unbalanced forces and noise normally associated with this type machine, asymmetric alternate pole winding connections usually are employed, thereby providing one half winding containing only north poles while the second half winding contains only south poles. Also, the reactance, magnetic forces and losses are minimized by using the asymmetric winding connection wherein leads 1, 3 and 2 come out of adjacent phase belts as in known practice.

The secondary for the motor may consist of a squirrel cage winding or a wound rotor depending on the work to be performed by the machine. The secondary of the wound rotor shown in Figure 1 consists of a winding C provided with slip rings 22 and a parallel arrangement of resistors 24 and reactors 26, each connected in Y as shown. The reactors may have D.-C. control windings for varying their saturation. Other known arrangements for the secondary can alternatively be used with the dual primary windings A and B. The embodiment shown in Figure 2 is employed only to illustrate one type of secondary circuit. For example, one or more saturable reactors in the secondary circuit may be combined with a fixed resistance and reactance network; or one or more contactors may be used to vary the amount of resistance or reactance for the network over a part of the speed range. Also, a wound rotor secondary without slip rings and having resistance and reactance elements mounted on the rotor in a manner to also provide proper ventilation may be utilized. As indicated above, these various types of secondary circuits are well known in the art and the examples are cited merely to show that such circuits are adaptable for use with the dual primary arrangement of windings comprising the subject of this invention.

In order to obtain the desired speed and torque performance from the wound rotor motor chosen to illustrate the invention, any kind of control circuit may be used as long as it is capable of changing the saturation of reactors 12 through 20 to the degree necessary for supplying the desired magnitude and phase of voltage to the dual windings A and B. One such control circuit is disclosed and claimed in the copending application of W. B. Jarvinen, Serial No. 631,560, filed December 31, 1956, entitled, "Control System for Induction Motor" and assigned to the same assignee as this invention. Briefly, the kind of system adapted for use with the dual winding motor consists of the pairs of contactors F and R for connecting each winding A and B to the power supply independently for either forward or reverse rotation as may be called for by the control. An amplistat or other magnetic amplifier is connected with the saturable reactors in each half winding for supplying the necessary direct current used in varying the saturation of the reactor core. The drawing generally shows this as a coil wound on a leg of the reactors and represented as being supplied with a D.-C. voltage. To control the speed, the D.-C. voltage supplied by a tachometer on the shaft of the motor or other speed sensitive device is matched against a reference voltage set by a control dial. The difference between the speed and reference voltages is applied to the amplistats, which deliver currents of corresponding magnitudes to the control windings of the two sets of reactors. The voltage applied to the motor and the motor torque change accordingly, the change continuing until the speed voltage matches the reference voltage established in the circuit.

In operation, to start the motor, the control currents of all the reactors are reduced to a low value, and both the F or forward contactors are then closed, permitting small currents to flow through both half windings. The control currents are then increased, thereby decreasing the series reactances and allowing more current to flow, until sufficient torque is produced to overcome the load torque, causing the motor to accelerate. By adjusting the magnitude of application of the control currents, the motor can be made to start smoothly and to accelerate as rapidly as desired.

To provide for braking and reversing without losing control of the load, the control circuit can be arranged so that, whenever the required motoring torque falls below about one quarter of rated value, the control currents in reactors 16 and 18 are reduced nearly to zero, and the forward contactor on half winding B drops out, and the corresponding reverse contactor closes, putting the B half winding in operation with a direction of rotation opposed to the A half winding. If still lower torque is required, the current in the reversed winding is built up, and that in the forward winding is reduced by the appropriate changes in their reactor control currents until the torque reaches about 20 percent of rated value in the overhauling or braking direction. If still further braking torque is required, the forward contactor of the second half winding drops out, and this half winding is reconnected also in the reversed direction, while the control currents of the corresponding reactors are maintained at a very low value. Operation of the machine in a braking direction is then controlled in the same manner as when motoring, with the two half windings showing the torque equally, as in normal full winding operation.

Figure 6:
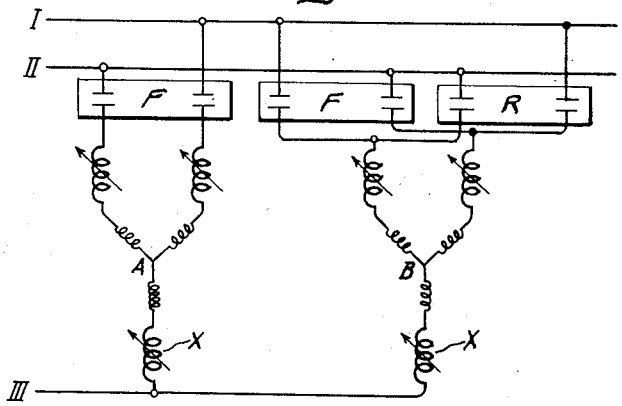
Figure 6 illustrates a modification wherein reversing contactors are employed in only one of the half windings for achieving half braking torque.

Referring now to the modification shown in Figure 6, an arrangement of contactors and reactors are provided for operating the motor over a full speed range and with full motoring torque but with one-half braking torque. This is accomplished by eliminating one of the R or reverse sets of contactors connected to the A half winding, for example. Operation in a forward direction is the same as that described in relation to Figure 1, but since only one half winding can be employed when reverse rotation is desired in Figure 6, the braking torque capable of being produced is limited. This type of winding arrangement is adapted for use in hoisting apparatus where intermittent duty with limited braking torque is required, thus eliminating the expense associated with providing the additional contactors necessary for full braking torque.

Figure 7 illustrates an arrangement where 10 reactors and no contactors are employed for obtaining a full range of speed and torque in meeting severe duty requirement. In this embodiment, pairs of parallel connected forward and reverse reactors F and R are interposed between each of two phases of dual primary windings A and B and the power lines I and II as shown. Additional reactors X are located between the third phase of each winding and power line III. Since each of the dual windings A and B essentially constitute a primary circuit for the motor, it will be evident that with this arrangement of reactors, either of the A or B windings may be used for obtaining a motoring or braking operation. Such operation will be performed at a reduced torque however and more efficient action is gained from the cooperative effort of both windings. Normally, the F reactors are employed for operating the two half windings A and B of the motor when supplying high torque in a forward direction. When a low torque is required, the D.-C. current in the F reactors for winding B for example, may be reduced and finally brought to zero thus leaving the A winding to carry the load alone. In the event a reversing torque or braking is required, the control current supplied to the F reactors of winding B is reduced to a zero level while the control current supplied to the R reactors of the same winding is increased. Then, the control current to reactors F of winding A is also reduced nearly to zero and that to the R reactors is increased. This action raises the reversed torque by virtue of the increased direct current supplied first to the B and then the A winding R reactors and lowers the forward torque due to the F reactor currents and thereby provides a smooth transition over the entire torque and speed range. In normal forward torque operation, the R reactors of both A and B windings have zero control current while in normal reverse torque operation, the F reactors of both A and B windings have zero control current. To obtain production of torques between these two extremes, direct current is supplied in varying amounts to the appropriate F or R reactors in the manner described above.

Figure 8:
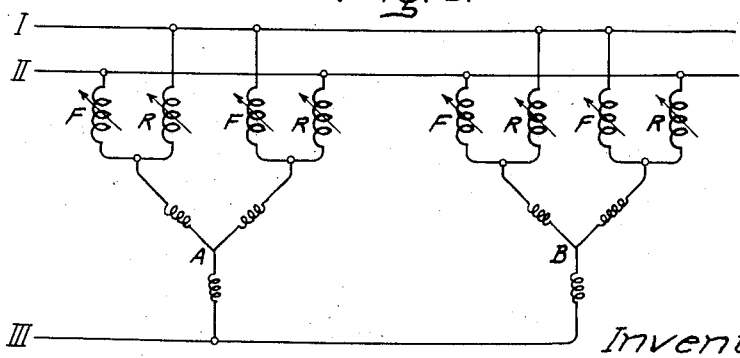
Figure 8 is still another modification showing the use of reactors in only two phases of each winding for obtaining full control of the machine.

As shown in Figure 8, the X reactors of Figure 7 may be eliminated thus reducing the cost of the apparatus, although an unbalance in motor voltages arises in the low torque region of operation and the available torque is less than that possible by the arrangement of Figure 7. However, this embodiment has particular application for small motors used for hoisting operations where a full range of torque and speed is desired with minimum costs. Obviously, where approximately half braking torque is desired, one set of R reactors shown in Figures 7 and 8 may be eliminated in the manner described and shown in Figure 6, and where no braking is necessary, all R reactors may be excluded. Also, reactors and contactors may be used in one half winding and reactors only in the other half winding.

In all these arrangements, the basic idea is to utilize the two substantially identical halves of the dual stator winding of the motor as if they were two independent motors whose torques can be added or subtracted or varied independently without affecting each other's operation. With these schemes, there is no appreciable parasitic current flowing between lines through the reactors because the sequence of operations enables the current in any reactor to be brought practically to zero before the current in the parallel-connected reactor is increased; and because in all cases the through reactance of the motor windings acting as a transformer holds the transferred current between half windings down to a low value.

Figure 4:
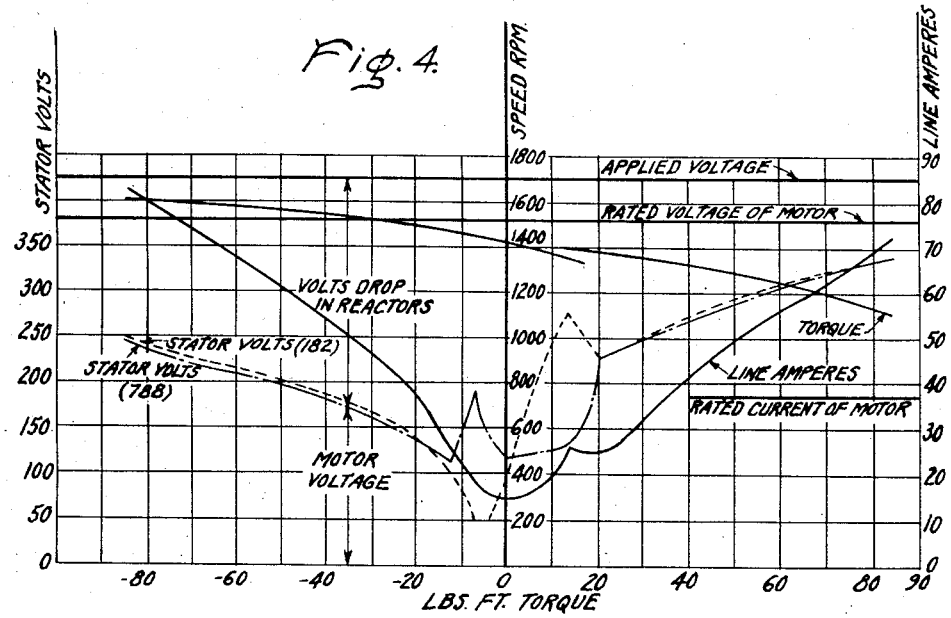
Figure 4 shows a plurality of curves illustrating voltage and current versus torque for a dual winding motor with saturable reactor speed control.

In order to show the desirable results achieved from using the saturable reactors in each of the two windings independently connected to power lines and independently controlled by a control circuit of the general type described above, tests were carried out on a 4-pole, 25 H.P., 220/440 volt wound rotor motor of conventional or standard design and the performance obtained is graphically illustrated by the curves shown in Figures 3 and 4. Although the values represent results obtained from a specific embodiment of the invention, it will be apparent that changes in design parameters for the motor, reactors and control circuit elements will produce corresponding results, but nevertheless will fall within the scope of the invention. As mentioned above, the principles disclosed also have application to other types and sizes of machines, such as squirrel cage induction motors that are more adaptable in installations requiring only a small range of speed adjustment as is necessary in driving a fan or a generator over a speed range between 80% and 100% for example.

Referring now to the aforementioned tests carried out on a wound rotor motor, Figure 3 shows that when the control was set for 1400 r.p.m., the motor delivered full load motoring torque (73 foot pounds) at a speed of 1200 r.p.m., or an equal braking torque at 1590 r.p.m. At maximum speed setting for 1800 r.p.m., the speed drop from full load braking to full load motoring was 430 r.p.m., while at the 200 r.p.m. setting the drop was 320 r.p.m. The shift from both windings motoring to opposed windings occurred at about 20 percent of full load torque, and the shift from opposed windings to both winding braking occurred at about the same torque in the reversed direction.

The three phase currents in each of the A and B windings remained balanced under all conditions of operation, even when the two windings were operating in opposed directions of rotation. This is explained by the fact that the "through reactance," which limits the circulating currents transferring power between the several phases, is quite high, so that the two windings perform in nearly all respects as if they were two independent motors on the same shaft.

The tests were made with the motor windings in Y, instead of their normal delta connection, so that the rated voltage and current of the motor were 380 volts and 37 amperes, respectively. The secondary resistor was 0.30 ohm, or 0.30 per unit, taking the rotor current base to be 91 amperes, the equivalent of the 37 amperes full load stator current. A 3-phase reactor with a closed iron circuit was connected in shunt with this resistor and was designed to draw about one quarter of the total rotor current under locked rotor, full voltage conditions, and in series with each phase of this reactor was a resistor of 0.03 per unit ohm. With this arrangement, the motor had approximately 10 percent slip at rated voltage and torque. The actual drop in full load speed was about 14 percent, as shown in Figure 3, because the motor voltage at the full load torque point was considerably less than the rated value of 380 volts, due to the drop in the series reactors.

As Figure 3 indicates, the motor speed with this arrangement could be set at any desired value from +1800 to −1800, and the motor then maintained this speed, with a reasonable amount of droop, over the full range from maximum motoring torque to maximum braking torque.

The primary reactors in this scheme are a means of varying the motor voltage to obtain the desired torque at all times. When the desired torque is less than that given by the motor operating on full voltage at the same speed, the motor voltage must be reduced correspondingly. If the ratio of the actual torque to the full voltage torque at the same speed is $\alpha^2$, the operating voltage and current of the motor will each be $\alpha$ times the values taken from the full voltage torque and current curves, and the total kva. drawn by the motor will be $\alpha$ times the kva. taken at the same speed with full voltage impressed.

Thus, the power factor of the motor at reduced torques will be $\alpha$ times the normal motor power factor at the same speed. However, under maximum torque conditions at each speed, the primary reactors will be fully saturated, and the voltage drop in them then will be relatively small. Accordingly, the output obtainable from the motor with the reactor control scheme is only slightly less than the normal full voltage value. The effect of the reactors is to reduce the power factor and increase the motor heating over the light load range, with little sacrifice in performance at high loads.

By designing the reactors to saturate completely, or by providing oversized amplistats to supply control currents well in excess of normal, or by designing the motor for a rated voltage somewhat less than the system voltage, thus making an allowance for the voltage drop in the reactor, or by a combination of these methods, the maximum output and average power factor values can be adjusted to best suit the requirements in each case.

Figure 4 shows the motor line current, that is, total current for the two windings, and the motor voltage, for the same test conditions as shown in Figure 3. The current versus torque curve resembles the V curve of a synchronous motor. At the 20 percent torque points, where the contactors shift the windings from aiding to opposing, the line currents are less than the rated full load value, so that the contactor duty is very light. The changeover from motoring to braking is what may be called a "soft plugging" operation.

It will be noted that the motor voltage was 325 volts, or 85 percent of normal at the full load motoring torque point, on the 1400 r.p.m. setting, and the corresponding motor current was 64 amperes, or 173 percent of the full load value. Thus, the total kva. taken by the motor at this point was 148 percent of rated value. At the full load braking torque point with the same speed setting, the motor volts and current were 59 and 202 percent, giving a total motor kva. 120 percent of normal. In this test, however, the primary reactors had a voltage rating only slightly in excess of that which would normally be used with the motor, so that they did not saturate to as low values as would be expected in actual service.

Figure 5:
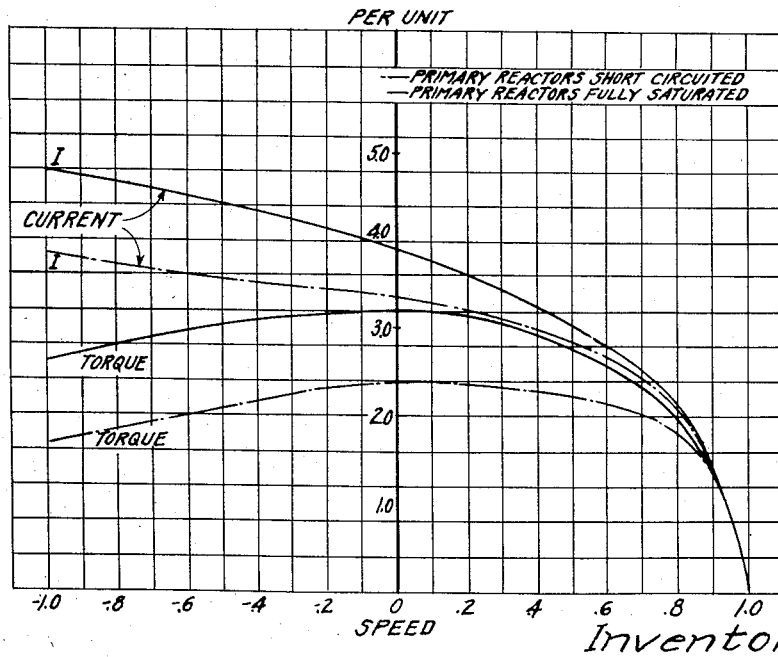
Figure 5 shows the calculated speed torque curves of a motor having reactor speed control and specifically designed for bascule bridge operation.

Figure 5 shows the calculated speed-torque curve of the motors for a proposed bascule bridge. Any combination of speed and torque inside the limiting values shown can be obtained without difficulty.

In this specific embodiment chosen to illustrate the invention, it has been shown that by means of amplistats, feed-back control circuits, and saturable reactors, a standard wound rotor motor can give adjustable constant speed performance similar to known D.-C. drives, over the complete range from +100 to −100 percent of normal torque. The kva. rating of the primary reactors required to give this performance is roughly 80 percent of the kva. rating of the motor. However, differences in normal current densities, temperature rises, and method of rating for motors and for reactors preclude making a precise statement of the kva. requirements for these parts.

An important feature of this dual-winding reactor speed control scheme is that it provides automatic braking, i.e., bringing the speed down promptly to a desired lower value, or to rest, without overshoot; as well as providing high accelerating torque to bring the motor promptly to a desired higher speed.

It will be apparent that many modifications and variations are possible in light of the above teachings. It therefore is to be understood that within the scope of the appended claims, the invention may be practiced otherwise than as specifically described.

What I claim as new and desire to secure by Letters Patent of the United States is:

1. A polyphase induction motor comprising a rotor supported for operation in a stator having three phase primary windings arranged in two independent substantially identical half windings with alternate pole connections wherein the circuits for one of said half windings comprises only north poles and the other only south poles, magnetic amplifiers of the type having alternating and direct current coils mounted on a core thereof for providing adjustable alternating current voltages to said windings, each of said amplifiers being connected between each phase of said windings and a power source so that with rated voltage applied to said windings with said amplifiers fully saturated, said motor will deliver maximum torque at a desired speed, and by adjusting the magnitude of control currents in said coils, adjustable constant speed performance of the motor is obtainable over a speed range extending to a maximum in either the forward or the reverse direction, while simultaneously supplying the torque requirements of a connected load over a full range of motoring and braking torque.

2. A polyphase induction motor comprising a rotor supported for operation in a stator having a pair of substantially identical and independent three phase primary half windings, a controllable magnetic amplifier interposed between at least two phases of each said half windings and a power source, for furnishing an adjustable alternating current voltage to each of said half windings, and contactor means connected between each of said amplifiers and said power source for supplying current to said windings for forward or reverse operation respectively of said motor so that when said contactor means are connected for said forward or reverse operation, voltages having magnitudes determined by said amplifiers are applied to each of said windings for obtaining a predetermined speed and torque output, and when said contactor means are connected to one of said windings for forward operation and the other for reverse operation, a torque and speed are produced in accordance with the magnitudes of voltages provided said windings by said amplifiers.

3. A polyphase induction motor comprising a rotor supported in a stator for electrodynamic cooperation therewith, a pair of half windings in said stator independently connected to a power source for permitting application of separate three phase voltages thereto, control means interposed between at least two phases of each of said windings and said power source for selectively controlling the magnitudes and directions of voltages to each of said windings to obtain motoring or braking operation of said motor by using a single half winding or both half windings or a combination of motoring and braking by selectively applying voltages to said half windings in opposite directions.

4. A polyphase induction motor comprising a rotor supported for rotation in a stator having first and second identical and independent three phase half windings with asymmetric alternate pole connections, a saturable reactor adapted for connection to an alternating current power source in at least two phases of each of said half windings for providing alternating current voltages thereto in accordance with the degree of saturation of said reactors, and a pair of contactors interposed between each of at least two of said reactors and said power source for respectively controlling the phase sequence of said voltages applied to said reactors so that when said reactors are fully saturated and the phase sequence of said voltages applied thereto is the same, the windings of said motor will cause production of a maximum torque in one direction, and to obtain a reduction in said torque, the reactors for said first half winding are progressively desaturated and finally open circuited leaving only the second half winding connected to said power source, and to still further reduce the torque of said motor, said first half winding is connected to its associated reactors with reverse phase sequence and the saturation of the latter increased while the saturation of the reactors for said second half winding are progressively decreased thus raising the reverse torque and lowering the torque furnished for forward operation.

5. A polyphase induction motor comprising a rotor supported in a stator for electrodynamic cooperation therewith, said stator comprising a frame having a pair of three phase half windings therein electrically independent of one another and forming a primary circuit for said motor, means connecting said half windings independently to a power source for supplying an A.-C. voltage thereto, saturable reactors in at least two phases of each of said half windings and each reactor being of a type capable of having the degree of magnetization of its core varied by a direct current so that when different values of direct current are applied to the reactors in the respective half windings, the voltages applied to the two half windings can be varied independently between zero and full voltage thereby causing their respective torques to add or to subtract, giving the desired resultant torque in either the forward or reverse direction.

6. A polyphase induction motor comprising a rotor supported in a stator for electrodynamic cooperation therewith, said stator comprising a frame having a pair of substantially identical and independent three phase half windings therein with asymmetric alternate pole connections, means connecting said windings with a source of alternating current voltage, first saturable reactors of the type capable of having the magnetization of their cores varied between minimum and maximum values connected between said power source and at least two of said phases of each of said windings for forward operation, and second similar saturable reactors connected between said power source and at least two of said phases of each of said windings for reverse operation, the connections of said reactors between said windings and the power source being such that according to the degrees of saturation of said reactors, alternating currents of selected magnitude can be supplied through any one or all of said reactors or through any combination thereof, of the desired magnitudes to their respective half windings in said motor for producing a torque of desired magnitude and direction in said rotor throughout a complete speed range of +100 or −100 percent, in either the forward or the reverse direction.

7. A polyphase induction motor comprising a rotor supported in a stator for electrodynamic cooperation therewith, a pair of substantially identical and independent three phase half windings in said stator connected for motor or braking operation, means independently controlling the voltage supplied to each of said windings including means for reversing the voltage thereto, said controlling means including means for gradually varying the voltage supplied to each of said half windings from substantially zero to full line voltage.

References Cited in the file of this patent

UNITED STATES PATENTS

| | | |
|---|---|---|
| 2,464,745 | Fuge | Mar. 15, 1949 |
| 2,469,294 | Dawson | May 3, 1949 |